United States Patent
Hoshi (10) Patent No.: US 10,608,264 B2
(45) Date of Patent: Mar. 31, 2020

(54) FUEL CELL SYSTEM AND CONTROL METHOD THEREFOR

(71) Applicant: NISSAN MOTOR CO., LTD., Yokohama-shi, Kanagawa (JP)

(72) Inventor: Kiyoshi Hoshi, Stuttgart (DE)

(73) Assignee: NISSAN MOTOR CO., LTD., Yokohama-shi (JP)

(*) Notice: Subject to any disclaimer, the term of this patent is extended or adjusted under 35 U.S.C. 154(b) by 146 days.

(21) Appl. No.: 14/759,514

(22) PCT Filed: Dec. 26, 2013

(86) PCT No.: PCT/JP2013/084807
§ 371 (c)(1),
(2) Date: Jul. 7, 2015

(87) PCT Pub. No.: WO2014/109239
PCT Pub. Date: Jul. 17, 2014

(65) Prior Publication Data
US 2015/0349360 A1     Dec. 3, 2015

(30) Foreign Application Priority Data
Jan. 9, 2013  (JP) .................. 2013-002134

(51) Int. Cl.
*H01M 8/04955*     (2016.01)
*H01M 8/04701*     (2016.01)
(Continued)

(52) U.S. Cl.
CPC ..... *H01M 8/04253* (2013.01); *H01M 8/0432* (2013.01); *H01M 8/04037* (2013.01);
(Continued)

(58) Field of Classification Search
CPC ......... H01M 8/04037; H01M 8/04253; H01M 8/04947; H01M 8/04828
(Continued)

(56) References Cited

U.S. PATENT DOCUMENTS

| | | | |
|---|---|---|---|
| 2001/0021468 A1* | 9/2001 | Kanai ................ | H01M 8/04119 429/414 |
| 2001/0028970 A1* | 10/2001 | Sano ....................... | H01M 8/04 429/413 |
| 2005/0019627 A1 | 1/2005 | Ozeki et al. | |
| 2005/0158593 A1* | 7/2005 | Minehisa .......... | H01M 8/04156 429/414 |
| 2009/0110970 A1 | 4/2009 | Tejima | |

(Continued)

FOREIGN PATENT DOCUMENTS

| CN | 1577931 A | 2/2005 |
|---|---|---|
| CN | 101496210 A | 7/2009 |

(Continued)

*Primary Examiner* — Robert S Jones
*Assistant Examiner* — Abibatu O Ojo-Amoo
(74) *Attorney, Agent, or Firm* — Foley & Lardner LLP (57) ABSTRACT

A fuel cell system includes an auxiliary machine driven by power of the fuel cell, a heater electrically connected to the fuel cell and configured to heat cooling water supplied to the fuel cell, and a warm-up control unit configured to control power supply to the auxiliary machine and the heater during start-up of the fuel cell below freezing point. The warm-up control unit is configured to compute a produced water amount until the temperature of the fuel cell increases to a freezing point temperature on the basis of a degree of wetness and a temperature of the fuel cell and a generated power of the fuel cell during warm-up, and increase a power ratio of power to the heater in regards to the auxiliary machine during the warm-up when the computed produced water amount is determined to be larger than a threshold value.

11 Claims, 6 Drawing Sheets

(51) Int. Cl.
*H01M 8/04828* (2016.01)
*H01M 8/04223* (2016.01)
*H01M 8/04007* (2016.01)
*H01M 8/0432* (2016.01)
*H01M 8/04492* (2016.01)
*H01M 8/04537* (2016.01)

(52) U.S. Cl.
CPC ... *H01M 8/04268* (2013.01); *H01M 8/04529* (2013.01); *H01M 8/04619* (2013.01); *H01M 8/04701* (2013.01); *H01M 8/04947* (2013.01); *H01M 8/04955* (2013.01); *H01M 2250/20* (2013.01); *Y02T 90/32* (2013.01)

(58) Field of Classification Search
USPC .......................................................... 429/429
See application file for complete search history.

(56) References Cited

U.S. PATENT DOCUMENTS

2010/0320960 A1 12/2010 Hasegawa
2012/0003557 A1 1/2012 Tanaka et al.

FOREIGN PATENT DOCUMENTS

| CN | 102318116 A | 1/2012 |
| EP | 2 206 185 A2 | 7/2010 |
| JP | 2004-192973 A | 7/2004 |
| JP | 2006-351280 A | 12/2006 |
| JP | 2009-004243 A | 1/2009 |
| JP | 2009-123613 A | 6/2009 |
| JP | 2009-283244 A | 12/2009 |
| WO | WO-2009/040516 A2 | 4/2009 |

\* cited by examiner

FUEL CELL SYSTEM AND CONTROL METHOD THEREFOR

TECHNICAL FIELD

This invention relates to a fuel cell system and a control method therefor during low temperature start-up.

BACKGROUND ART

A temperature range suitable for power generation of a fuel cell to be mounted in a vehicle is generally about 70° C. Thus, the temperature of the fuel cell needs to be quickly increased to the temperature range suitable for power generation when starting the vehicle. JP2009-4243A discloses a fuel cell system for shortening a warm-up time of fuel cells utilizing self-heat generation that is generated by driving the fuel cells themselves to generate power.

SUMMARY OF INVENTION

The above fuel cell system may be started at a low temperature of −30° C., for example, depending on a vehicle's usage environment. In such a case, water produced in electrolyte membranes may exceed a water retaining amount of the electrolyte membranes and overflow in association with the self-heat generation of the fuel cells and the overflowed water is frozen below freezing point. Thus, when the fuel cell system is started below freezing point, the diffusivity of gas passing through the electrolyte membranes is deteriorated due to the freezing of the produced water and it may become impossible to generate power.

The present invention was developed in view of such a problem. The present invention aims to suppress the freezing of produced water during the warm-up of fuel cells below freezing point.

A fuel cell system according to one aspect of the present invention includes an auxiliary machine electrically connected to a fuel cell, the auxiliary machine being driven by power of the fuel cell, a heater electrically connected to the fuel cell, the heater being configured to heat cooling water supplied to the fuel cell, and a warm-up control unit configured to warm up the fuel cell itself by the supply of power to the auxiliary machine and the heater during start-up of the fuel cell below freezing point. The warm-up control unit includes a water amount computation unit configured to compute a produced water amount on the basis of a degree of wetness and a temperature of the fuel cell and a generated power of the fuel cell during warm-up, the produced water amount being a water amount produced in an electrolyte membrane until the temperature of the fuel cell increases to a freezing point temperature, and an anti-freezing control unit configured to increase a power ratio of power to the heater in regards to the auxiliary machine during the warm-up when the computed produced water amount is determined to be larger than a threshold value.

DESCRIPTION OF EMBODIMENT

Hereinafter, an embodiment of the present invention will be described with reference to the accompanying drawings.

Figure 1:
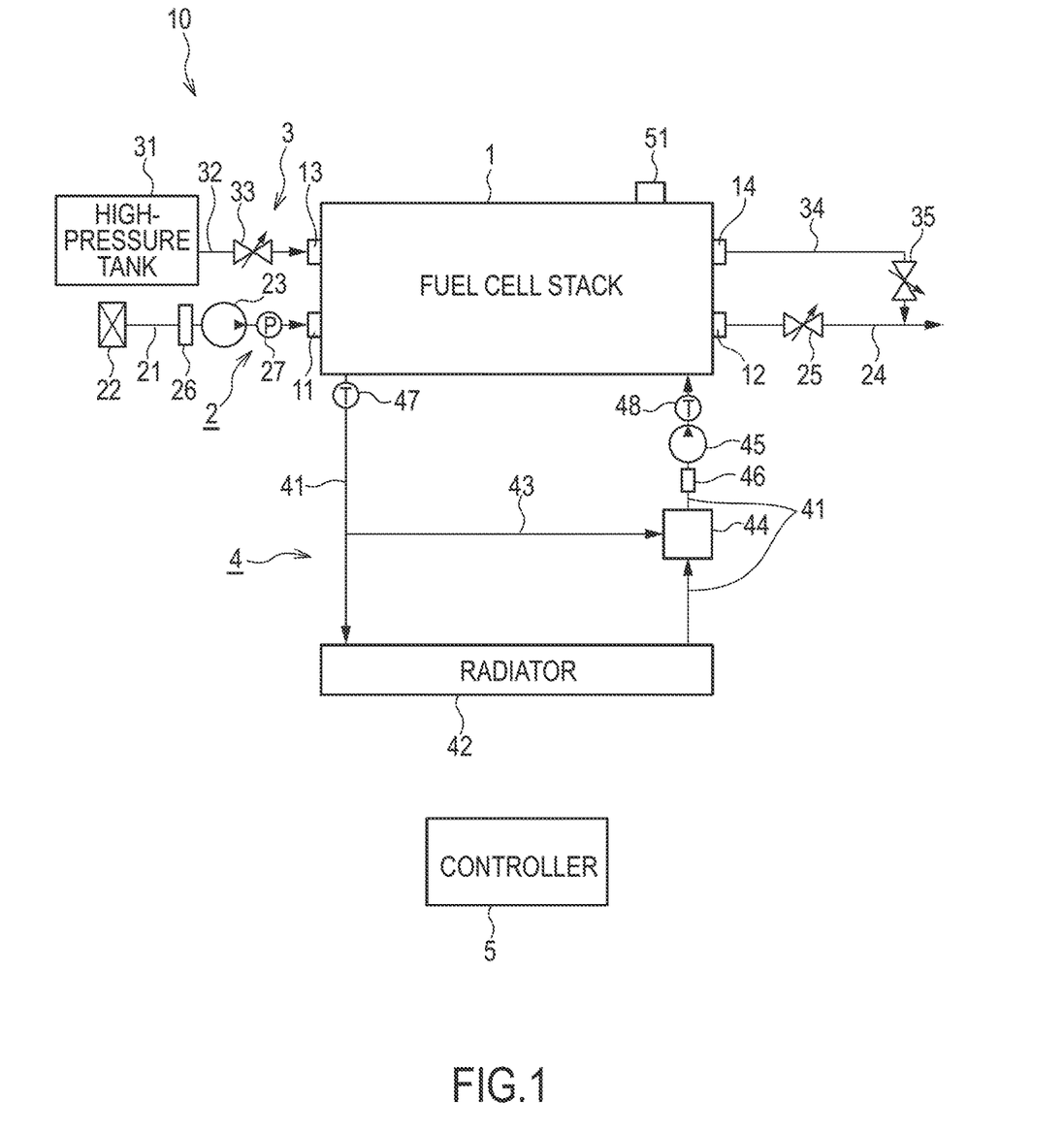
FIG. 1 is a configuration diagram showing a fuel cell system according to an embodiment of the present invention.

FIG. 1 is a schematic diagram showing a fuel cell system according to a first embodiment of the present invention.

A fuel cell system 10 is a system for warming up a fuel cell stack 1 utilizing self-heat generated by power generation of the fuel cell stack itself when the fuel cell stack 1 is started. The fuel cell system 10 includes the fuel cell stack 1, a cathode gas supplying/discharging device 2, an anode gas supplying/discharging device 3, a stack cooling device 4 and a controller 5. The cathode gas supplying/discharging device 2, the anode gas supplying/discharging device 3 and the stack cooling device 4 are used as auxiliary machines of the fuel cell stack 1.

The fuel cell stack 1 is formed by laminating several hundreds of fuel cells. The fuel cell stack 1 is used as a drive source for an automotive vehicle in the present embodiment.

In a fuel cell, an electrolyte membrane is sandwiched between an anode electrode (fuel electrode) and a cathode electrode (oxidant electrode). The fuel cell generates power by supplying anode gas (fuel gas) containing hydrogen to the anode electrode and cathode gas (oxidant gas) containing oxygen to the cathode electrode. Electrode reactions which proceed in both anode and cathode electrodes are respectively expressed in (1) and (2).

[Chemical Formulae 1]

Anode electrode: $2H_2 \rightarrow 4H^+ + 4e^-$  (1)

Cathode electrode: $4H^+ + 4e^- + O_2 \rightarrow 2H_2O$  (2)

The fuel cell generates an electromotive force and produces water by the above electrode reactions (1) and (2). Since a multitude of such fuel cells are laminated, a voltage of several hundreds of volts is generated in the fuel cell stack 1. The fuel cell stack 1 supplies power necessary, for example, to drive a vehicle, upon receiving the supply of the anode gas and the cathode gas. The fuel cell stack 1 includes, for example, a resistance detector 51.

The resistance detector 51 detects an impedance (resistance value) of the electrolyte membranes to obtain a degree of wetness of the fuel cells. The smaller the degree of wetness of the electrolyte membranes (the drier the electrolyte membranes by having a small water content inside), the larger the impedance. The larger the degree of wetness of the electrolyte membranes (the wetter the electrolyte membranes by having a large water content inside), the smaller the impedance.

The resistance detector 51 obtains the impedance by an HFR (High Frequency Resistance) measurement technique. The resistance detector 51 detects a voltage variation of the fuel cell stack 1 by causing a power generation current of the fuel cell stack 1 to vary in a sine wave pattern of 1 kHz (kilohertz). Then, the resistance detector 51 obtains a resistance value by dividing an alternating-current voltage amplitude of 1 kHz by an alternating current amplitude. The resistance detector 51 outputs a cell resistance signal indicating the resistance value to the controller 5.

The cathode gas supplying/discharging device 2 is a device for supplying the cathode gas to the fuel cell stack 1 and discharging cathode off-gas flowing out from the fuel cell stack 1 to outside air. The cathode gas supplying/discharging device 2 includes a cathode gas supply passage 21, a filter 22, a cathode compressor 23, a cathode gas discharge passage 24, a cathode pressure regulating valve 25, an air flow sensor 26 and a pressure sensor 27.

The cathode gas supply passage 21 is a passage for supplying the cathode gas to the fuel cell stack 1. One end of the cathode gas supply passage 21 is connected to the filter 22 and the other end is connected to a cathode gas inlet hole 11.

The filter 22 removes foreign substances contained in the cathode gas to be taken into the cathode gas supply passage 21.

The cathode compressor 23 is provided in the cathode gas supply passage 21. The cathode compressor 23 introduces air from outside air into the cathode gas supply passage 21 via the filter 22 and supplies it as the cathode gas to the fuel cell stack 1.

The cathode gas discharge passage 24 is a passage for discharging the cathode off-gas from the fuel cell stack 1. One end of the cathode gas discharge passage 24 is connected to a cathode gas outlet hole 12, and the other end is open.

The cathode pressure regulating valve 25 is provided in the cathode gas discharge passage 24. The cathode pressure regulating valve 25 is controlled to be opened and closed by the controller 5. By this open/close control, a pressure of the cathode gas (hereinafter, referred to as "cathode pressure") flowing in a part of the passage upstream of the cathode pressure regulating valve 25 is adjusted to a desired pressure.

The air flow sensor 26 is provided upstream of the cathode compressor 23 in the cathode gas supply passage 21. The air flow sensor 26 detects a flow rate of the cathode gas flowing in the cathode gas supply passage 21.

The pressure sensor 27 is provided near the cathode gas inlet hole 11 in the cathode gas supply passage 21. The pressure sensor 27 detects a cathode pressure. The controller 5 adjusts an opening of the cathode pressure regulating valve 25 on the basis of a detection value of the pressure sensor 27. In this way, the cathode pressure is adjusted to a desired pressure.

The anode gas supplying/discharging device 3 is a device for supplying the anode gas to the fuel cell stack 1 and discharging anode off-gas discharged from the fuel cell stack 1 to the cathode gas discharge passage 24. The anode gas supplying/discharging device 3 includes a high-pressure tank 31, an anode gas supply passage 32, an anode pressure regulating valve 33, an anode gas discharge passage 34 and a purge valve 35.

The high-pressure tank 31 stores the anode gas to be supplied to the fuel cell stack 1 in a high-pressure state.

The anode gas supply passage 32 is a passage for supplying the anode gas from the high-pressure tank 31 to the fuel cell stack 1. One end of the anode gas supply passage 32 is connected to the high-pressure tank 31 and the other end is connected to an anode gas inlet hole 13.

The anode pressure regulating valve 33 is provided in the anode gas supply passage 32. The anode pressure regulating valve 33 is controlled to be opened and closed by the controller 5. By this open/close control, a pressure of the anode gas flowing from the high-pressure tank 31 to the anode gas supply passage 32 is adjusted to a desired pressure.

The anode gas discharge passage 34 is a passage for discharging the anode off-gas flowing out from the fuel cell stack 1. One end of the anode gas discharge passage 34 is connected to an anode gas outlet hole 14 of the fuel cell stack 1 and the other end is connected to the cathode gas discharge passage 24.

The purge valve 35 is provided in the anode gas discharge passage 34. The purge valve 35 is controlled to be opened and closed by the controller 5. By this open/close control, a flow rate of the anode off-gas to be merged into the cathode gas discharge passage 24 is controlled.

The stack cooling device 4 is a device for cooling the fuel cell stack 1 and keeping it at a temperature suitable for power generation of the fuel cell stack 1. The stack cooling device 4 includes a cooling water circulation passage 41, a radiator 42, a bypass passage 43, a thermostat 44, a circulation pump 45, a heater 46, a first water temperature sensor 47 and a second water temperature sensor 48.

The cooling water circulation passage 41 is a passage for circulating cooling water for cooling the fuel cell stack 1.

The radiator 42 is provided in the cooling water circulation passage 41. The radiator 42 cools the cooling water discharged from the fuel cell stack 1.

The bypass passage 43 is a passage bypassing the radiator 42. One end of the bypass passage 43 is connected to the cooling water circulation passage 41 and the other end is connected to the thermostat 44.

The thermostat 44 is provided downstream of the radiator 42 in the cooling water circulation passage 41. The thermostat 44 is an on-off valve. The thermostat 44 automatically opens and closes based on the temperature of the cooling water flowing inside.

The thermostat 44 closes and supplies only the cooling water flowing by way of the bypass passage 43 and having a relatively high temperature to the fuel cell stack 1 when the temperature of the cooling water flowing inside is lower than a predetermined thermostat valve opening temperature.

On the other hand, the thermostat 44 starts to gradually open when the temperature of the cooling water flowing inside becomes the same or higher than the thermostat valve opening temperature. Then, the thermostat 44 mixes the cooling water flowing by way of the bypass passage 43 and the cooling water flowing by way of the radiator 42 and having a relatively low temperature inside and supplies the mixture to the fuel cell stack 1.

The circulation pump 45 is provided downstream of the thermostat 44 in the cooling water circulation passage 41. The circulation pump 45 circulates the cooling water flowing through the fuel cell stack 1. A discharge flow rate of the circulation pump 45 is controlled by the controller 5.

The heater 46 is provided between the thermostat 44 and the circulation pump 45 in the cooling water circulation passage 41. The heater 46 is energized during the warm-up of the fuel cell stack 1 to increase the temperature of the cooling water. For example, a PTC heater is used as the heater 46.

The first water temperature sensor 47 is provided upstream of a branching point of the cooling water circulation passage 41 and the bypass passage 43 in the cooling water circulation passage 41. The first water temperature sensor 47 detects the temperature of the cooling water discharged from the fuel cell stack 1 (hereinafter, referred to as "stack outlet water temperature"). The first water temperature sensor 47 outputs the detected stack outlet water temperature to the controller 5.

The second water temperature sensor 48 is provided downstream of the circulation pump 45 in the cooling water circulation passage 41. The second water temperature sensor 48 detects the temperature of the cooling water flowing into the fuel cell stack 1 (hereinafter, referred to as "stack inlet water temperature"). The second water temperature sensor 48 outputs the detected stack inlet water temperature to the controller 5.

The controller 5 is configured by a microcomputer including a central processing unit (CPU), a read-only memory (ROM), a random access memory (RAM) and an input/output interface (I/O interface).

To the controller 5 are input the stack outlet water temperature from the first water temperature sensor 47, the stack inlet water temperature from the second water temperature sensor 48 and the cell resistance signal from the resistance detector 51.

The controller 5 causes the fuel cell stack 1 to generate power on the basis of the stack inlet water temperature, the stack outlet water temperature and the cell resistance signal. The controller 5 normally supplies the cathode gas and the anode gas at the minimum necessary flow rates for power generation to the fuel cell stack 1 by controlling the cathode compressor 23, the cathode pressure regulating valve 25, the anode pressure regulating valve 33 and the purge valve 35.

The controller 5 executes a control of warming up the fuel cell stack 1 to a power generation temperature suitable for power generation, e.g. 60° C. (hereinafter, referred to as a "warm-up promoting operation") when the fuel cell stack 10 is started.

During the warm-up promoting operation, the cathode gas and the anode gas are respectively supplied to the fuel cell stack 1 at flow rates necessary for the warm-up of the fuel cell stack 1. This causes the fuel cell stack 1 to generate power and the fuel cell stack 1 itself is warmed by self-heat generation accompanying the power generation.

The controller 5 distributes the power generated in the fuel cell stack 1 to the cathode compressor 23, the circulation pump 45, the heater 46 and the like. At this time, the controller 5 allots power larger than normal to the cathode compressor 23 and the heater 46 out of the generated power of the fuel cell stack 1.

Specifically, the controller 5 sets the opening of the cathode pressure regulating valve 25 to achieve a cathode pressure higher than a minimum air pressure necessary for the power generation of the fuel cell stack 1 and the controller 5 sets a flow rate of air discharged from the cathode compressor 23 at an upper limit value of a variable range.

Further, the controller 5 sets a heating temperature (output) of the heater 46 at an upper limit value of a variable range. Thus, the temperature of the fuel cell stack 1 reaches the temperature suitable for power generation early by both the heating of the cooling water by the heater 46 and the self-heat generation, whereby the warm-up of the fuel cell stack 1 is completed.

By increasing the generated power consumed by both the cathode compressor 23 and the heater 46 in the warm-up promoting operation in this way, a heat generation amount of the fuel cell stack 1 is increased. In this way, a start-up time from the start of the fuel cell stack 1 to the completion of the warm-up of the fuel cell stack 1 can be shortened.

However, a fuel cell system may be started at a low temperature of −30° C. below freezing point, for example, depending a vehicle's usage environment. In such a case, if water produced in electrolyte membranes in association with the power generation of a fuel cell stack overflows from the electrolyte membranes, the overflowed water will freeze due to the environment below freezing point. As a result, the diffusivity of gas passing through the electrolyte membranes is deteriorated by the freezing of the produced water and it may become impossible to generate power when the fuel cell stack is warmed up during the start-up of the fuel cell system below freezing point.

Accordingly, in the present embodiment, an amount of produced water of the fuel cells at the time of a temperature increase to a freezing point temperature is estimated in advance, and a switch is made to a warm-up control of increasing a temperature increasing amount of the fuel cells per increase amount of the produced water when the produced water amount exceeds an upper limit value of a water retaining amount retainable in the electrolyte membranes.

Figure 2:
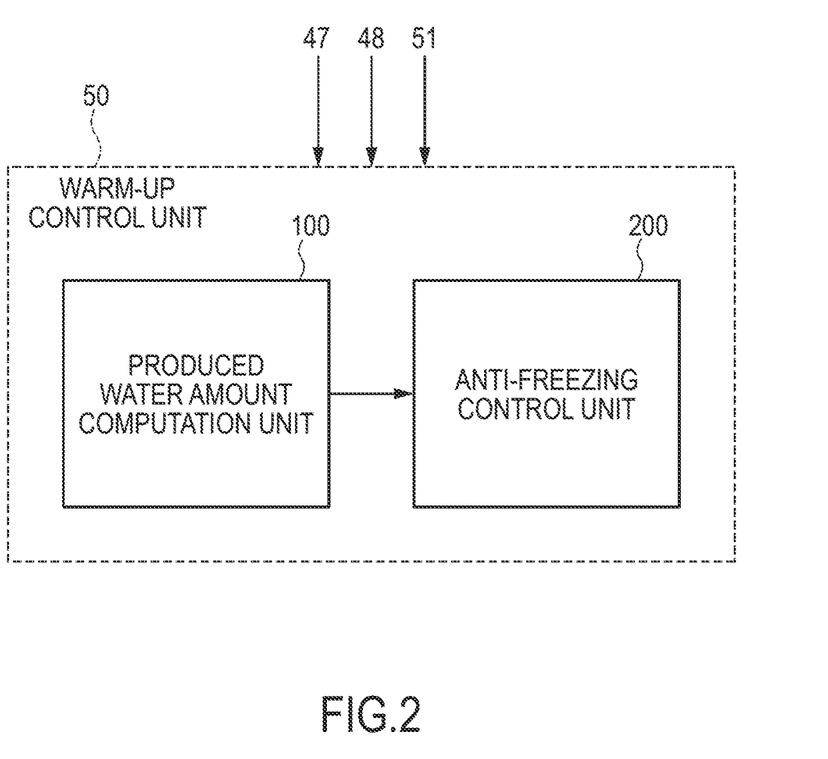
FIG. 2 is a diagram showing the configuration of a warm-up control unit in a controller.

FIG. 2 is a configuration diagram showing functions of a warm-up control unit in the controller 5.

The warm-up control unit 50 warms up the fuel cell stack 1 by controlling power supplied to the cathode compressor 23, the heater 46 and the like when the fuel cell system 10 is started below freezing point. The warm-up control unit 50 includes a produced water amount computation unit 100 and an anti-freezing control unit 200.

The produced water amount computation unit 100 computes the amount of water produced in the electrolyte membranes (hereinafter, referred to as a "produced water amount") until the temperature of the fuel cells increases to the freezing point temperature on the basis of the degree of wetness of the fuel cells, the temperature of the fuel cells and the generated power during the warm-up in response to a start-up command to the fuel cell stack 1. It should be noted that a specific configuration is described later with reference to FIG. 3.

The produced water amount computation unit 100 outputs the calculated produced water amount to the anti-freezing control unit 200 in the form of a determination signal for determining whether or not the amount of water produced in the electrolyte membranes is in excess.

It should be noted that the produced water amount computation unit 100 may determine whether or not the produced water amount is larger than a water retaining amount threshold value and output a determination result to the anti-freezing control unit 200 instead of outputting a produced water amount to the anti-freezing control unit 200. For example, the produced water amount computation unit 100 outputs an anti-freezing operation command when it has determined that the produced water amount is larger than the water retaining amount threshold value and the produced water amount computation unit 100 outputs a normal warm-up promoting operation command when it has determined that the produced water amount is not larger than the water retaining amount threshold value. The water retaining amount threshold value is a threshold value for detecting the leakage of the produced water from the electrolyte membranes and the water retaining amount threshold value is set on the basis of experimental data or the like.

The anti-freezing control unit 200 performs the normal warm-up promoting operation when the produced water amount calculated by the produced water amount computation unit 100 is not larger than the water retaining amount threshold value. In the warm-up promoting operation, the anti-freezing control unit 200 supplies power larger than necessary for the power generation of the fuel cell stack 1 (hereinafter, referred to as "warm-up power") to the cathode compressor 23 and supplies maximum power within the variable range as predetermined power necessary for the warm-up to the heater 46.

On the other hand, the anti-freezing control unit 200 performs the anti-freezing operation when the produced water amount is larger than the water retaining amount threshold value. Specifically, the anti-freezing control unit 200 increases a ratio of power to the heater 46 in respect to the cathode compressor 23 as compared with during the warm-up promoting operation.

Figure 3:
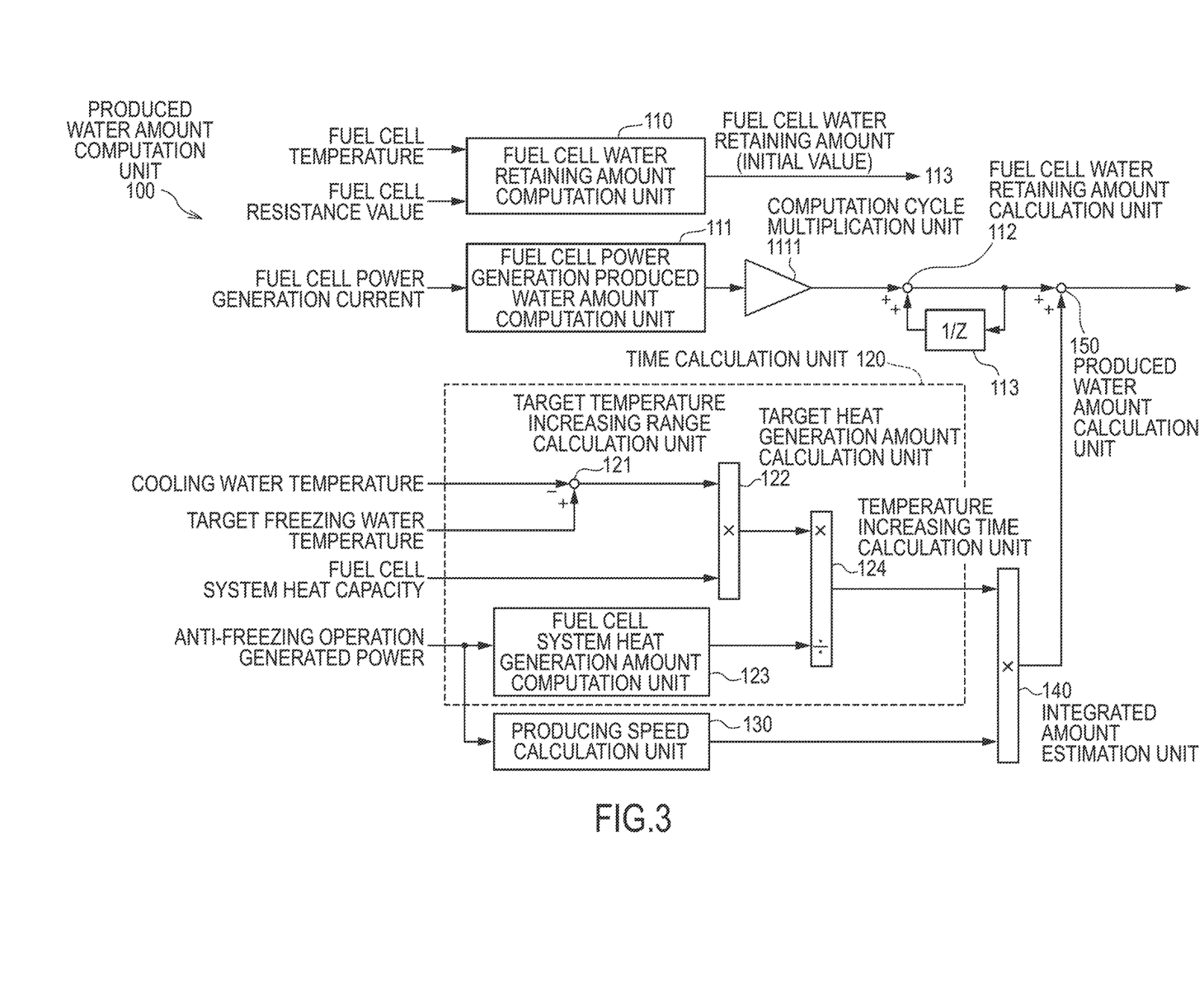
FIG. 3 is a configuration diagram showing the details of a produced water amount computation unit.

FIG. 3 is a configuration diagram showing the details of the produced water amount computation unit 100 in the present embodiment.

The produced water amount computation unit 100 calculates an average temperature, which is an average value of the stack outlet water temperature from the first water temperature sensor 47 and the stack inlet water temperature from the second water temperature sensor 48, as a fuel cell temperature. Further, the produced water amount computation unit 100 obtains the resistance value of the fuel cells from the resistance detector 51.

The fuel cell resistance value and the fuel cell temperature are held in the produced water amount computation unit 100. These fuel cell resistance value and fuel cell temperature are values detected when the fuel cell stack 1 was previously stopped. During start-up below freezing point, the resistance value of the fuel cells is generally high due to the freezing of the fuel cell stack 1. In this case, there is a possibility that a correlation relationship between the degree of wetness and the resistance value of the fuel cells largely deviates and an error in the degree of wetness of the fuel cells becomes large. Thus, accuracy in calculating the degree of wetness of the fuel cells during start-up can be enhanced by using the resistance value and the temperature of the fuel cells at the time of the last stop at which time deviation of the correlation relationship was relatively small.

The produced water amount computation unit 100 includes a fuel cell water retaining amount computation unit (hereinafter, referred to as a "water retaining amount computation unit") 110, a fuel cell power generation produced water amount computation unit (hereinafter, referred to as a power generation produced water amount computation unit") 111, a fuel cell water retaining amount calculation unit 112, a time calculation unit 120, a producing speed calculation unit 130, an integrated amount estimation unit 140 and a produced water amount calculation unit 150.

The water retaining amount computation unit 110 calculates the water retaining amount of the electrolyte membranes (fuel cells) as an initial value on the basis of the fuel cell temperature and the fuel cell resistance value at the time of the last stop after receiving a start-up command for the fuel cell stack 1. Then, the water retaining amount computation unit 110 outputs the initial value of the fuel cell water retaining amount to an integration unit 113.

In the present embodiment, correlation data indicating a relationship between the fuel cell resistance value and the degree of wetness is stored for each temperature of the fuel cells in the water retaining amount computation unit 110 in advance. The water retaining amount computation unit 110 computes the degree of wetness of the fuel cells by referring to the correlation data on the fuel cell temperature after obtaining the fuel cell temperature and the fuel cell resistance value at the time of the last stop. Then, the water retaining amount computation unit 110 calculates the initial value using the degree of wetness of the fuel cells and a conversion coefficient to the water retaining amount.

The power generation produced water amount computation unit 111 computes the power generation produced water amount on the basis of a power generation state in a computation cycle. For example, the power generation produced water amount can be expressed by Equation (3). In Equation (3), Wv [g/sec] denotes the power generation produced water amount, I [A] denotes the power generation current, F [C/mol] denotes a Faraday constant, n denotes the number of electrons generated (or consumed) per 1 mol of reactant, Nc [cell] denotes a cell number of the fuel cell stack 1 and Mw [g/mol] denotes a molecular weight of water.

[Equation 1]

$$Wv = \frac{I}{nF} \cdot Nc \cdot Mw \qquad (3)$$

The power generation produced water amount computation unit 111 calculates a power generation produced water amount per unit time using Equation (3) and outputs it to a computation cycle multiplication unit 1111. The computation cycle multiplication unit 1111 outputs the power generation produced water amount in each computation cycle obtained by multiplying the power generation produced water amount per unit time by the value of the computation cycle as a computation result to the fuel cell water retaining amount calculation unit 112.

Even in a method other than the one above, for example the water retaining amount computation unit 110 may newly obtain the fuel cell temperature and the fuel cell resistance value in each computation cycle, successively calculate the water retaining amount using the correlation data and use the calculated values as the computation result of the fuel cell water retaining amount calculation unit 112 if conditions on which the resistance value can be detected by the resistance detector 51 are satisfied. It should be noted that correction data indicating a correction value for correcting the resistance value according to the temperature of the fuel cells may be stored in the water retaining amount computation unit 110 in advance and the water retaining amount may be calculated on the basis of the correction value represented by that correction data.

The fuel cell water retaining amount calculation unit 112 calculates the current fuel cell water retaining amount by adding the computation result of the power generation produced water amount computation unit 111 to the last value of the computation result of the fuel cell water retaining amount calculation unit 112.

The time calculation unit 120 calculates a time until the temperature of the fuel cell stack 1 reaches the vicinity of 0 (zero) ° C. after the start-up of the fuel cell stack 1 below freezing point (hereinafter, referred to as a "power generation temperature increasing time") on the basis of the pre-set generated power during the anti-freezing operation (warm-up). The set value of the generated power is smaller than the generated power during the warm-up promoting operation and is stored in the produced water amount computation unit 100 in advance.

Here, the generated power during the warm-up promoting operation may be input to the time calculation unit 120. Since an IV characteristic of the fuel cells is generally such that a loss (power generation amount) increases as the fuel cell temperature decreases, a large amount of heat is generated by performing the warm-up promoting operation first, and a transition is made to the anti-freezing operation before a produced water amount SWO exceeds the water retaining amount threshold value in a range where the produced water amount SWO is not larger than the water retaining amount threshold value in the present embodiment. This can enhance the estimation accuracy of the produced water amount SWO by increasing the fuel cell temperature early, prevent power generation from becoming impossible due to the freezing of water in the fuel cell stack 1 and shorten the warm-up time. Thus, the generated power during the anti-freezing operation is input.

The time calculation unit 120 includes a target temperature increase range calculation unit 121, a target heat generation amount calculation unit 122, a fuel cell system heat generation amount computation unit (hereinafter, merely referred to as a "heat generation amount computation unit") 123 and a temperature increasing time calculation unit 124.

The target temperature increase range calculation unit 121 calculates a value obtained by subtracting the cooling water temperature from the target freezing point temperature as a target temperature increase range to obtain the amount of water produced until the temperature of the fuel cell stack 1 reaches the target freezing point temperature.

For example, a temperature near 0° C. is set as the target freezing point temperature. Further, the cooling water temperature is used as the temperature of the fuel cell stack 1. In the present embodiment, the stack inlet water temperature is used as the cooling water temperature. Since the stack inlet water temperature normally indicates a value lower than the stack outlet water temperature, a larger produced water amount can be estimated than in the case of using the stack outlet water temperature. This can prevent the leakage of the produced water from the electrolyte membranes below freezing point due to an estimation error of the produced water amount. Specifically, the stack inlet water temperature is used as a temperature on a safe side to prevent the freezing of the produced water.

The target heat generation amount calculation unit 122 outputs a value obtained by multiplying a fuel cell system capacity and the target temperature increase range as a target heat generation amount to the temperature increasing time calculation unit 124. It should be noted that the fuel cell system capacity is determined in view of heat capacities of the fuel cell stack 1, the cooling water circulation passage 41 and the cooling water. Further, in order to increase the estimation accuracy of the produced water amount, it is desirable to additionally consider the amount of heat radiated to the outside.

The heat generation amount computation unit 123 calculates a heat generation amount of the fuel cell system 10 contributing to a temperature increase of the fuel cell stack 1 on the basis of the set value of the generated power during the warm-up. The heat generation amount computation unit 123 outputs the calculated heat generation amount to the temperature increasing time calculation unit 124.

In the present embodiment, cell characteristic information at the target freezing point temperature is stored in the heat generation amount computation unit 123 in advance. The cell characteristic information represents a cell voltage corresponding to the power generation current of the fuel cell stack 1, i.e. a current-voltage (IV) characteristic. The heat generation amount computation unit 123 specifies a cell voltage on the basis of the generated power during the warm-up by referring to the cell characteristic information and the heat generation amount computation unit 123 calculates a heat generation amount by the power generation of the fuel cell stack 1 on the basis of a difference between the cell voltage and a theoretical voltage.

Generally, the lower the fuel cell temperature, the poorer the cell characteristic and the poorer the power generation efficiency of the fuel cells. Thus, the difference between the cell voltage and the theoretical voltage of the fuel cell stack 1 becomes larger. Specifically, the lower the fuel cell temperature, the larger the heat generation amount of the fuel cell stack 1. As a result, the amount of water produced in the electrolyte membranes increases. Thus, by using the cell characteristic information near 0° C., the produced water amount estimated during start-up below freezing point indicates a value on a safer side than the actual produced water amount.

The temperature increasing time calculation unit 124 outputs a value obtained by dividing the target heat generation amount from the target heat generation amount calculation unit 122 by the heat generation amount of the fuel cell system 10 from the heat generation amount computation unit 123 as a temperature increasing time to the integrated amount estimation unit 140.

The producing speed calculation unit 130 calculates an increase amount of the produced water per unit time, i.e. an increasing speed of the produced water amount, on the basis of the set value of the generated power during the warm-up.

In the present embodiment, the cell characteristic information at the target freezing point temperature is stored in the producing speed calculation unit 130 in advance. As described above, the cell characteristic information represents the relationship between the power generation current and the cell voltage of the fuel cell stack 1.

The producing speed calculation unit 130 specifies the value of the power generation current related to the set value of the generated power by referring to the cell characteristic information when obtaining the set value of the generated power during the warm-up. Then, the producing speed calculation unit 130 calculates the produced water amount per unit time on the basis of the specified power generation current and the conversion coefficient. Further, the producing speed calculation unit 130 outputs the produced water amount per unit time to the integrated amount estimation unit 140.

The integrated amount estimation unit 140 estimates an integrated amount of the produced water on the basis of the produced water amount per unit time from the producing speed calculation unit 130 and the power generation temperature increasing time from the temperature increasing time calculation unit 124. This estimation value indicates the amount of water produced in the electrolyte membranes by the warm-up promoting operation until the target freezing point temperature is reached after the fuel cell system 10 is started.

In the present embodiment, the integrated amount estimation unit 140 outputs a value obtained by multiplying the produced water amount per unit time by the power generation temperature increasing time as the integrated amount of the produced water to the produced water amount calculation unit 150.

The produced water amount calculation unit 150 calculates a value obtained by adding the integrated amount of the produced water and the water retaining amount from the water retaining amount computation unit 110 as an estimation value of the amount of water produced in all the electrolyte membranes when the temperature of the fuel cells reaches the freezing point temperature.

As just described, the produced water amount computation unit 100 calculates the power generation temperature increasing time necessary for a temperature increase from the cooling water temperature to the target freezing point temperature during start-up on the basis of the heat capacity of the fuel cell system 10 and the set value of the generated power during the warm-up. Then, the produced water amount computation unit 100 calculates the heat generation amount per unit time from the generated power during the warm-up using the IV characteristic and estimates the integrated amount of the produced water by multiplying the heat generation amount per unit time by the power generation temperature increasing time.

Further, the produced water amount computation unit 100 calculates the water retaining amount of the electrolyte membranes during start-up using the temperature and the resistance value of the fuel cells at the time of the last stop and estimates the produced water amount of all the electrolyte membranes when the temperature of the fuel cells is increased to the freezing point temperature by adding the water retaining amount of the electrolyte membranes during start-up and the integrated amount of the produced water. Further, the produced water amount computation unit 100 updates the current water retaining amount of the fuel cells according to the power generation current during the warm-up promoting operation and estimates the produced water amount of all the electrolyte membranes when the temperature of the fuel cells is increased to the freezing point temperature by adding the current fuel cell water retaining amount and the integrated amount of the produced water. In this way, it becomes possible to determine whether or not the produced water amount of all the electrolyte membranes exceeds the upper limit value of the water retaining amount of the electrolyte membranes until the fuel cells are warmed up to the freezing point temperature.

Figure 4:
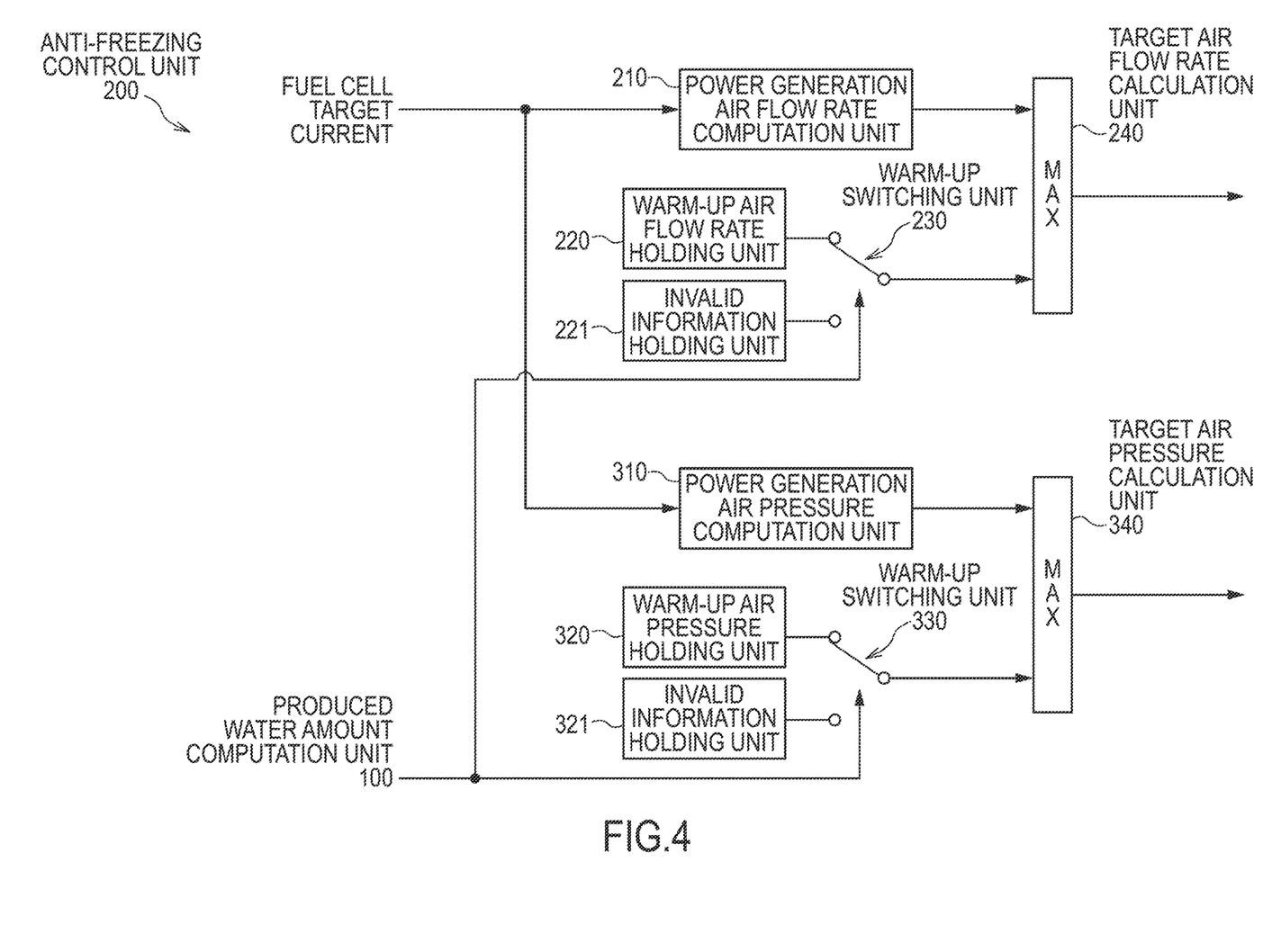
FIG. 4 is a configuration diagram showing the details of an anti-freezing control unit.

FIG. 4 is a configuration diagram showing the details of the anti-freezing control unit 200.

The anti-freezing control unit 200 obtains a fuel cell target current as the value of the minimum power generation current necessary for the power generation of the fuel cells. Further, the anti-freezing control unit 200 receives a control signal indicating the produced water amount from the produced water amount computation unit 100.

The anti-freezing control unit 200 switches the warm-up promoting operation to the anti-freezing operation on the basis of a control signal from the produced water amount computation unit 100 and the anti-freezing control unit 200 determines a target air flow rate and a target air pressure of the cathode compressor 23 on the basis of the fuel cell target current.

The anti-freezing control unit 200 includes a power generation air flow rate computation unit 210, a warm-up air flow rate holding unit 220, an invalid information holding unit 221, a warm-up switching unit 230 and a target air flow rate calculation unit 240. The anti-freezing control unit 200 also includes a power generation air pressure computation unit 310, a warm-up air pressure holding unit 320, an invalid information holding unit 321, a warm-up switching unit 330 and a target air pressure calculation unit 340.

The power generation air flow rate computation unit 210 calculates a power generation air flow rate on the basis of a minimum fuel cell target value necessary for the power generation of the fuel cell stack 1 and the conversion coefficient.

The warm-up air flow rate holding unit 220 holds a warm-up air flow rate necessary for the warm-up promoting operation. The warm-up air flow rate is a value larger than the power generation air flow rate. For example, an upper limit value of a range in which the air flow rate of the cathode compressor 23 can be set is held in the warm-up air flow rate holding unit 220.

The invalid information holding unit 221 holds invalid information for switching an operating state to the anti-freezing operation by invalidating the warm-up promoting operation. For example, invalid information indicating 0 (zero) is held as a value smaller than the power generation air flow rate in the invalid information holding unit 221.

The warm-up switching unit 230 outputs either the information in the warm-up air flow rate holding unit 220 or that in the invalid information holding unit 221 to the target air flow rate calculation unit 240 in accordance with a control signal from the produced water amount calculation unit 100. The warm-up switching unit 230 is, for example, realized by a switch circuit.

The warm-up switching unit 230 determines that the produced water leaks out from the electrolyte membranes before the freezing point temperature is reached and outputs the invalid information indicating zero concerning the air flow rate from the invalid information holding unit 221 if the produced water amount indicated by the control signal is larger than the water retaining amount threshold value.

On the other hand, the warm-up switching unit 230 determines that the produced water does not leak out from the electrolyte membranes even if the freezing point temperature is reached and outputs the warm-up air flow rate from the warm-up air flow rate holding unit 220 if the produced water amount is smaller than the retaining water amount threshold value.

The target air flow rate calculation unit 240 outputs the larger value between the power generation air flow rate and the information from the warm-up switching unit 230 as the target air flow rate.

For example, the target air flow rate calculation unit 240 outputs the warm-up air flow rate, which is the larger of the warm-up air flow rate and the power generation air flow rate, as the target air flow rate when the produced water amount is not larger than the water retaining amount threshold value. Specifically, the target air flow rate calculation unit 240 sets the air flow rate necessary to warm up the fuel cell stack 1 in the cathode compressor 23 if the produced water does not leak out from the electrolyte membranes.

On the other hand, the target air flow rate calculation unit 240 outputs the power generation air flow rate, which is the larger of the invalid information indicating zero concerning the air flow rate and the power generation air flow rate, as the target air flow rate when the produced water amount is larger than the water retaining amount threshold value. Specifically, the target air flow rate calculation unit 240 sets the minimum air flow rate necessary for the power generation in the cathode compressor 23 in advance if the produced water leaks out from the electrolyte membranes. In this way, the warm-up operating state of the fuel cell system 10 transitions to the anti-freezing operation, wherefore the increase amount (increasing speed) of the water produced in the electrolyte membranes is suppressed.

Next, the setting of the target air pressure of the cathode compressor 23 will be described.

The power generation air pressure computation unit 310 calculates a power generation air pressure on the basis of the minimum fuel cell target value necessary for the power generation of the fuel cell stack 1 and the conversion coefficient.

The warm-up air pressure holding unit 320 holds a warm-up air pressure necessary for the warm-up promoting operation. The warm-up air pressure is a value larger than the power generation air pressure. For example, an upper limit value of an air pressure setting range deter mined by the cathode compressor 23 and the cathode pressure regulating valve 25 is held in the warm-up air pressure holding unit 320.

The invalid information holding unit 321 holds invalid information for switching the operating state to the anti-freezing operation by invalidating the warm-up promoting operation. Invalid information indicating 0 (zero) is held as a value smaller than the power generation air pressure in the invalid information holding unit 321.

The warm-up switching unit 330 outputs either the information in the warm-up air pressure holding unit 320 or that in the invalid information holding unit 321 to the target air pressure calculation unit 340 in accordance with a control signal from the produced water amount calculation unit 100. The warm-up switching unit 330 is, for example, realized by a switch circuit.

The warm-up switching unit 330 determines that the produced water leaks out from the electrolyte membranes before the freezing point temperature is reached and outputs the invalid information indicating zero concerning the air pressure from the invalid information holding unit 321 if the produced water amount indicated by the control signal is larger than the water retaining amount threshold value.

On the other hand, the warm-up switching unit 330 determines that the produced water does not leak out from the electrolyte membranes even if the freezing point temperature is reached and outputs the warm-up air pressure from the warm-up air pressure holding unit 320 if the produced water amount is smaller than the retaining water amount threshold value.

The target air pressure calculation unit 340 outputs the larger value between the power generation air pressure and the information from the warm-up switching unit 330 as the target air pressure.

For example, the target air pressure calculation unit 340 outputs the warm-up air pressure, which is the larger of the warm-up air pressure and the power generation air pressure, as the target air pressure when the produced water amount is not larger than the water retaining amount threshold value. Specifically, the target air pressure calculation unit 340 controls in the cathode compressor 23 and the cathode pressure regulating valve 25 on the basis of the air pressure necessary to warm up the fuel cell stack 1 if the produced water does not leak out from the electrolyte membranes.

On the other hand, the target air pressure calculation unit 340 outputs the power generation air pressure, which is the larger of the invalid information indicating zero concerning the air pressure and the power generation air pressure, as the target air pressure when the produced water amount is larger than the water retaining amount threshold value. Specifically, the target air pressure calculation unit 340 controls the cathode compressor 23 and the cathode pressure regulating valve 25 on the basis of the minimum air pressure necessary for the power generation of the fuel cell stack 1 if the produced water leaks out from the electrolyte membranes. In this way, the operating state of the fuel cell system 10 transitions to the anti-freezing operation, wherefore the increase amount per unit time of the water produced in the electrolyte membranes is suppressed.

As just described, if the produced water amount is predicted to leak out from the electrolyte membranes before the temperature of the fuel cells reaches 0° C., the anti-freezing control unit 200 adjusts the cathode compressor 23 and the cathode pressure regulating valve 25 on the basis of the minimum power generation current necessary for the power generation of the fuel cell stack 1. Since the air flow rate and the air pressure are reduced in this way, the heat generation amount of the fuel cell stack 1 can be suppressed. On the other hand, the warm-up control unit 50 maintains the power supplied to the heater 46 at a constant.

Thus, the warm-up control unit 50 reduces the power supplied to the cathode compressor 23 with the power supplied to the heater 46 from the fuel cell stack 1 kept constant by switching to the anti-freezing operation. In this way, the power ratio of the power supplied to the heater 46 in regards to the power supplied to the cathode compressor 23 can be increased.

Accordingly, a heat radiation amount to the fuel cell stack 1 by the heater 46 is maintained constant while the amount of water produced in the electrolyte membranes is reduced. As just described, since the warm-up control unit 50 does not change the heat radiation amount to the fuel cells while reducing the increasing speed of the produced water amount, the temperature increasing amount per unit produced water amount can be increased.

Next, the operation of the warm-up control unit 50 in the controller 5 will be described in detail.

Figure 5:
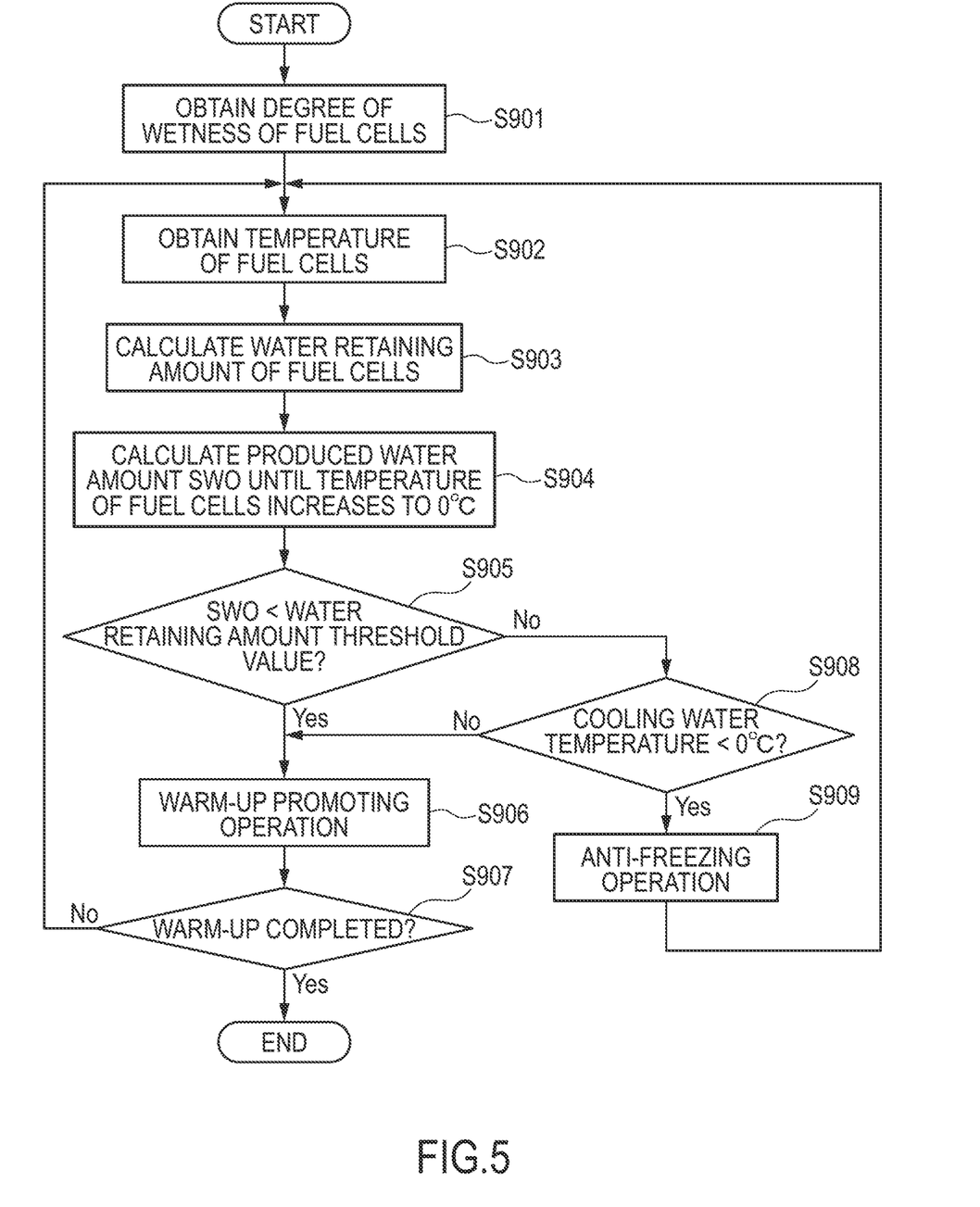
FIG. 5 is a flow chart showing a control method by the warm-up control unit.

FIG. 5 is a flow chart showing a control method of the warm-up control unit 50.

First, in Step S901, the water retaining amount computation unit 110 calculates the degree of wetness of the fuel cells on the basis of the fuel cell temperature and the fuel cell resistance value at the time of the last stop using the predetermined correlation data when receiving a start-up command for the fuel cell stack 1.

In Step S902, the water retaining amount computation unit 110 obtains the stack inlet water temperature from the second water temperature sensor 48.

In Step S903, the water retaining amount computation unit 110 calculates the water retaining amount of the electrolyte membranes as the initial value using the degree of wetness of the fuel cells and the conversion coefficient. Then, the fuel cell water retaining amount calculation unit 112 calculates the current water retaining amount of the electrolyte membranes using the initial value of the water retaining amount and the computation result from the fuel cell power generation produced water amount computation unit 111. Specifically, the fuel cell water retaining amount calculation unit 112 updates the current water retaining amount of the electrolyte membranes according to the power generation current during the warm-up promoting operation.

In Step S904, the produced water amount calculation unit 150 calculates the produced water amount SWO by adding the integrated amount of the water produced in the electrolyte membranes by the warm-up promoting operation and the water retaining amount on the basis of the water retaining amount of the electrolyte membranes, the set value of the generated power during the anti-freezing operation and the stack inlet water temperature.

Specifically, the temperature increasing time calculation unit 124 calculates the power generation temperature increasing time until the temperature is increased to 0° C. from the stack inlet water temperature on the basis of the set value of the generated power during the anti-freezing operation, the heat capacity of the fuel cell system 10 and the stack inlet water temperature. Further, the producing speed calculation unit 130 calculates the heat generation amount of the fuel cell stack 1 per unit time from the set value of the generated power using the IV characteristic information and the producing speed calculation unit 130 calculates the integrated amount of the produced water by multiplying the heat generation amount of the fuel cell stack 1 per unit time by the power generation temperature increasing time. Then, the produced water amount calculation unit 150 calculates the produced water amount SWO by adding the integrated amount of the produced water from the integrated amount estimation unit 140 and the water retaining amount from the fuel cell water retaining amount calculation unit 112.

In Step S905, the warm-up control unit 50 determines whether or not the produced water amount SWO is larger than the water retaining amount threshold value. Then, the warm-up control unit 50 proceeds to Step S908 when determining that the produced water amount SWO is larger than the water retaining amount threshold value.

In Step S908, the warm-up control unit 50 determines whether or not the stack inlet water temperature is above 0° C. The warm-up control unit 50 proceeds to Step S906 to perform the warm-up promoting operation when determining that the stack inlet water temperature is above 0° C.

On the other hand, if the stack inlet water temperature is determined not to be above 0° C. in Step S908, a transition is made to Step S909 to perform the anti-freezing operation. In Step S909, the warm-up control unit 50 performs the anti-freezing operation to increase the power ratio of the power to the heater 46 in relation to the cathode compressor 23. In the present embodiment, the warm-up control unit 50 reduces the flow rate and the pressure of the air supplied to the fuel cell stack 1 to minimum values necessary for power generation by controlling the cathode compressor 23 and the cathode pressure regulating valve 25 without changing the power supplied to the heater 46 from the fuel cell stack 1.

Then, the warm-up control unit 50 repeatedly performs a series of processings from Step S902 in a predetermined operation cycle (e.g. 100 ms) until the warm-up of the fuel cell stack 1 is completed.

On the other hand, the warm-up control unit 50 proceeds to Step S906 when determining in Step S905 that the produced water amount SWO is not larger than the water retaining amount threshold value.

When determining in Step S905 that the produced water amount SWO is not larger than the water retaining amount threshold value, the warm-up control unit 50 performs the warm-up promoting operation until the stack inlet water temperature reaches a power generation temperature of 60°, for example. In the present embodiment, the warm-up control unit 50 sets the heater 46 and the cathode compressor 23 at the upper limit values of the variable ranges. Then, the warm-up control unit 50 determines that the warm-up has been completed and finishes the warm-up promoting operation when the temperature of the fuel cells reaches the temperature suitable for power generation.

Then, the warm-up control unit 50 repeatedly performs a series of processings from Step S902 in the predetermined operation cycle (e.g. 100 ms) until the warm-up of the fuel cell stack 1 is completed.

Then, the warm-up control unit 50 causes the warm-up operating state of the fuel cell system 10 to transit from the anti-freezing operation to the normal warm-up promoting operation when the cooling water temperature becomes 0° C. or higher or the produced water amount SWO becomes below the water retaining amount threshold value. Then, the warm-up is finished when the temperature of the fuel cells reaches the temperature suitable for power generation.

Figure 6:
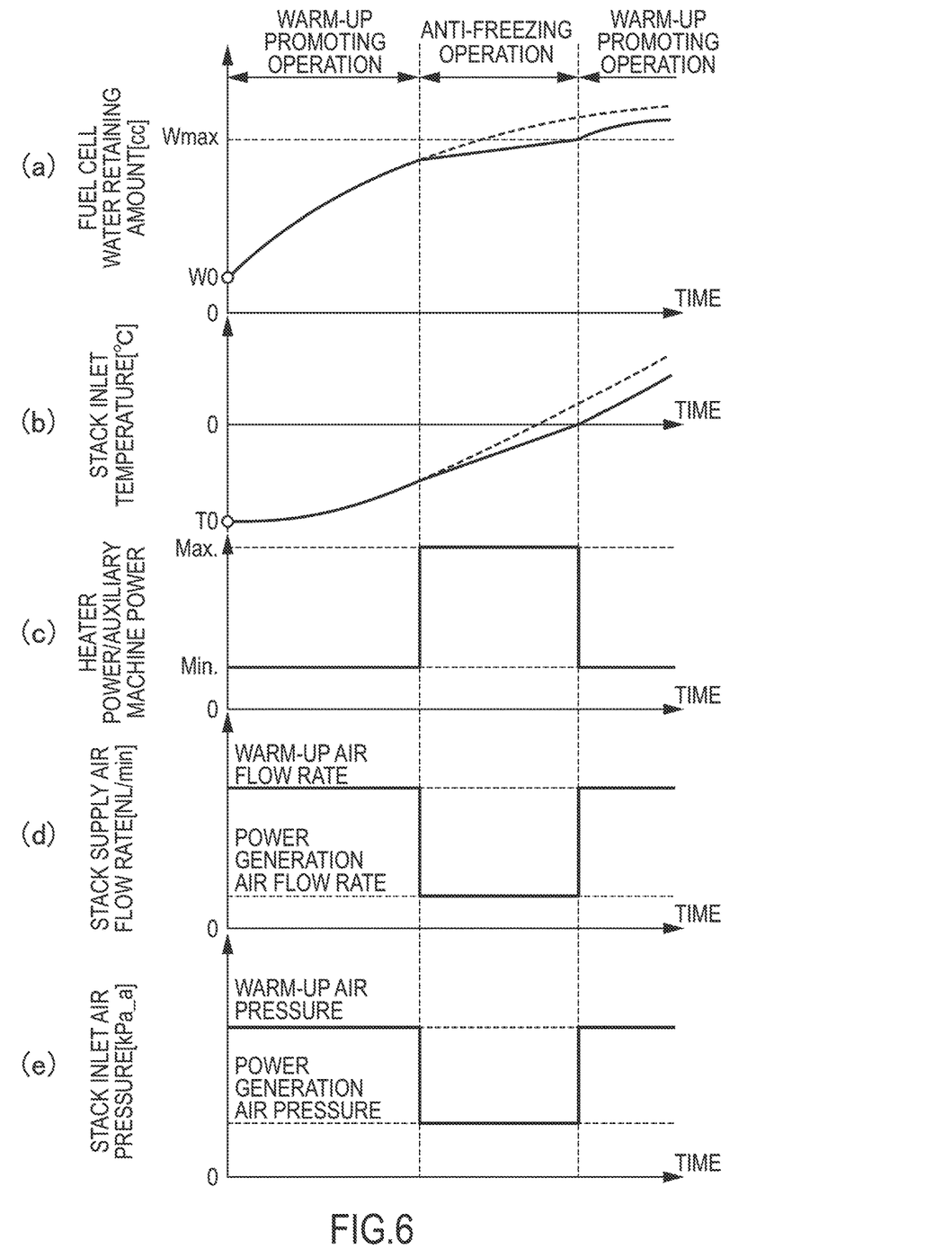
FIG. 6 is a diagram showing a technique of avoiding the freezing of produced water by an anti-freezing control.

FIG. 6 are charts showing examples of state changes of the fuel cell system by the anti-freezing operation. FIG. 6(*a*) is a chart showing a change of the water retaining amount of the fuel cell stack 1. FIG. 6(*b*) is a chart showing a change of the stack inlet water temperature. FIG. 6(*c*) is a chart showing a change of a ratio of the power supplied to the heater 46 to the power supplied to the auxiliary machine from the fuel cell stack 1. FIG. 6(*d*) is a chart showing a change of a stack supply air amount. FIG. 6(*e*) is a chart showing a change of a stack inlet air pressure.

In FIGS. 6(*a*) to 6(*e*), changes when a transition was made from the warm-up promoting operation to the anti-freezing operation are shown with a solid line and changes during start-up only by the warm-up promoting operation are shown with a dotted line. Further, horizontal axes represent time and vertical axes represent the fuel cell water retaining amount W, the stack inlet water temperature, the heater power/auxiliary machine power, the stack supply air flow rate and the stack inlet air pressure.

As shown in FIG. 6(*a*), the water retaining amount increases from a water retaining amount W0 during start-up due to the warm-up promoting operation as the stack inlet temperature (cooling water temperature) increases.

The warm-up control unit 50 obtains the water retaining amount W0 during start-up, estimates the integrated amount of the water produced in the electrolyte membranes until the temperature of the fuel cells reaches 0° C. from a temperature below freezing point T0 by the warm-up promoting operation and calculates the produced water amount by adding the water retaining amount W0 and the integrated amount. Then, the warm-up control unit 50 determines whether or not the produced water amount is larger than an upper limit value Wmax.

In the operating state shown with a solid line, whether or not the produced water amount when the temperature of the fuel cells reaches 0° C. is larger than the upper limit value Wmax of the water retaining amount is successively determined when the generated power during the warm-up promoting operation continues, and a switch is made from the warm-up promoting operation to the anti-freezing operation when the produced water amount is determined to be larger than the upper limit value Wmax of the water retaining amount. Specifically, the warm-up control unit 50 reduces the flow rate and the pressure of the air supplied to the fuel cell stack 1 by reducing the power supplied to the cathode compressor (auxiliary machine) 23 with the power supply to the heater 46 from the fuel cell stack 1 kept constant. In this way, the power ratio of the heater to the auxiliary machine increases as shown in FIG. 6(*c*).

As a result, the power generation current of the fuel cell stack 1 decreases and the amount of water generated in the fuel cells decreases. On the other hand, since the power supplied to the heater 46 is maintained constant, the heat radiation amount to the fuel cell stack 1 by the heater 46 does not change.

Accordingly, a reduction in the temperature increasing amount of the fuel cells can be minimized while the produced water amount can be reduced. Thus, as shown in FIG. 6, the amount of heating to the fuel cells per unit produced water increases if a switch is made from the warm-up promoting operation to the anti-freezing operation during the warm-up operation. Therefore, it can be avoided that the produced water overflows from the electrolyte membranes and is frozen before 0° C. is reached.

It should be noted that, in the present embodiment, the power ratio of power to the heater 46 in regards to the cathode compressor 23 is increased by maintaining the power supplied to the heater 46 from the fuel cell stack 1 constant and reducing the power supplied to the cathode compressor 23. However, if it is possible to further increase the power supplied to the heater 46, an amount of power corresponding to a reduction of the power supplied to the cathode compressor 23 from the fuel cell stack 1 may be allotted to the power supply to the heater 46. In this case, the temperature increasing speed of the fuel cells per unit produced water can be increased and the warm-up time can be made shorter.

According to the present embodiment, the produced water amount computation unit 100 computes the amount of water produced in the electrolyte membranes until the temperature of the fuel cells increases to the freezing point temperature on the basis of the degree of wetness and the temperature of the fuel cells and the generated power during the warm-up. The anti-freezing control unit 200 increases the power ratio of power to the heater 46 in regards to the cathode compressor 23 during the warm-up of the fuel cells when the calculated produced water amount is larger than the water retaining amount threshold value.

The fuel cells are warmed up by the self-heat generation due to power generation, but warmed up also by the amount of heat supplied to the cooling water in the case that the heater 46 is provided in the fuel cell system. Thus, in the case of warming up the fuel cells by the heater 46 and the cathode compressor 23, the temperature increasing amount of the fuel cells in relation to the power generation amount (produced water amount) increases by increasing the power ratio of the heater 46.

Thus, if there is a possibility that the produced water amount exceeds the water retaining amount threshold value and the produced water is frozen during the warm-up, the warm-up (above freezing point) of the fuel cells can be completed before the produced water amount overflows from the electrolyte membranes by increasing the power ratio of the heater 46 to the cathode compressor 23. Therefore, the freezing of the produced water in the fuel cell stack 1 can be prevented.

Further, in the present embodiment, the warm-up control unit 50 causes the fuel cell stack 1 to supply the warm-up power larger than the minimum power necessary for power generation to the cathode compressor 23 and supply predetermined power necessary for the warm-up to the heater 46 in the warm-up promoting operation. Then, the anti-freezing control unit 200 increases the power ratio to the heater 46 by reducing the warm-up power.

Thus, the increasing speed of the produced water amount associated with the power generation can be reduced by suppressing the amount of air supplied from the cathode compressor 23 to the fuel cell stack 1 while the amount of heat supplied to the cooling water from the heater 46 is maintained. Therefore, a reduction of the produced water amount and a delay of the warm-up complete time can be minimized.

Further, in the present embodiment, the anti-freezing control unit 200 stops the supply of the warm-up power to the cathode compressor 23 and controls the cathode compressor 23 by the air amount based on the minimum power generation current necessary for the power generation of the fuel cell stack 1 when the produced water amount is larger than the water retaining amount threshold value.

As just described, the anti-freezing control unit 200 sets a reduction of the power supplied to the cathode compressor 23 at a minimum power value necessary for the power generation of the fuel cell stack 1. In this way, it can be avoided that the power generation state of the fuel cell stack 1 becomes unstable due to a supply shortage of the air amount to the fuel cell stack 1.

Further, in the present embodiment, the integrated amount estimation unit 140 estimates the integrated amount of the produced water by calculating the power generation temperature increasing time and until the temperature of the fuel cell stack 1 reaches the vicinity of 0° after the fuel cell stack 1 is started on the basis of the temperature of the fuel cells and the set value of the generated power during the warm-up. The produced water amount calculation unit 150 calculates the sum of the water retaining amount based on the degree of wetness of the fuel cells and the integrated amount of the produced water as the produced water amount.

As just described, the produced water amount computation unit 100 can accurately estimate the produced water amount at a time at which the temperature of the fuel cell system 1 reaches the vicinity of 0° C. after the fuel cell system 1 is started by obtaining the water retaining amount based on the degree of wetness of the fuel cells in addition to the integrated amount of produced water based on the power generation temperature increasing time. Thus, it becomes possible to precisely determine whether or not the produced water will overflow from the electrolyte membranes below freezing point.

Further, in the present embodiment, the warm-up control unit 50 detects the resistance value of the fuel cells when the fuel cell stack 1 is stopped. The produced water amount computation unit 100 calculates the degree of wetness of the fuel cells on the basis of the resistance value at the time of the stop during start-up below freezing point.

In this way, the produced water amount computation unit 100 calculates the degree of wetness using the resistance value at the time of the last stop even if the resistance value increases due to the freezing of the fuel cells. Thus, a variation of an error in the degree of wetness due to the freezing of the fuel cells can be prevented. Therefore, the estimation accuracy of the produced water amount can be enhanced.

Further, in the present embodiment, the cell characteristic information representing the cell voltage corresponding to the power generation current of the fuel cells is stored in the heat generation amount computation unit 123 in advance. The heat generation amount computation unit 123 specifies the cell voltage on the basis of the set value of the generated power during the warm-up using the cell characteristic information and the heat generation amount computation unit 123 calculates the heat generation amount of the fuel cell stack 1 on the basis of the difference between the cell voltage and the theoretical voltage.

In this way, the heat generation amount computation unit 123 can accurately obtain the heat generation amount of the fuel cell stack 1 by the generated power during the warm-up. Thus, the estimation accuracy of the produced water amount can be enhanced.

Further, in the present embodiment, the producing speed calculation unit 130 specifies the power generation current by the cell characteristic information on the basis of the set value of the generated power during the warm-up and the producing speed calculation unit 130 calculates the produced water amount per unit time by multiplying the power generation current by the conversion coefficient. Then, the integrated amount estimation unit 140 calculates the integrated amount of the water produced until the temperature of the fuel cells reaches the vicinity of 0° C. on the basis of the produced water amount per unit time and the power generation temperature increasing time.

As just described, the produced water amount computation unit 100 obtains the power generation current corresponding to the generated power during the warm-up from the IV characteristic of the fuel cells and the produced water amount computation unit 100 calculates the integrated amount of the produced water from the power generation current. Thus, the power generation current is obtained in consideration of the IV characteristic, wherefore the estimation accuracy of the produced water amount can be enhanced.

Further, in the present embodiment, the temperature of the cooling water flowing into the fuel cell stack 1 (stack inlet water temperature) is used as the temperature of the fuel cells for estimating the integrated amount of the produced water. Since the stack inlet water temperature is lower than the actual temperature of the fuel cell stack 1, the produced water amount is estimated to be larger than its actual amount in the produced water amount computation unit 100. Thus, the operating state of the fuel cell stack 1 can be switched to the anti-freezing operation on the safe side.

Although the embodiment of the present invention has been described above, the above embodiment is merely an illustration of one application example of the present invention and not of the nature to limit the technical scope of the present invention to the specific configuration of the above embodiment.

For example, although the air flow rate and the air pressure for the fuel cell stack 1 are simultaneously switched to the air flow rate and the air pressure necessary for power generation in response to a warm-up request in order to increase the power ratio to the heater 46 in the above embodiment, a switching method is not limited to the simultaneous switch and either one may be switched earlier than the other or the both may be made variable between the warm-up request and a power generation request. By controlling the fuel cell water retaining amount to become Wmax when the stack inlet water temperature reaches the freezing point in this way, the warm-up time can be minimized.

Further, although whether or not the inlet temperature of the cooling water is the freezing point temperature is determined on the basis of whether or not the inlet temperature of the cooling water is 0° in the present embodiment, the freezing point temperature is not limited to 0° C. and may be a temperature other than 0° C. if the effects of the present invention can be obtained.

It should be noted that the above embodiments can be appropriately combined.

The present application claims a priority of Japanese Patent Application No. 2013-002134 filed with the Japan Patent Office on Jan. 9, 2013, all the contents of which are hereby incorporated by reference.

The invention claimed is:

1. A fuel cell system comprising:
an auxiliary machine electrically connected to a fuel cell, the auxiliary machine being driven by power of the fuel cell;
a heater electrically connected to the fuel cell, the heater being configured to heat cooling water supplied to the fuel cell; and
a controller programmed to:
supply the power to the auxiliary machine and the heater so as to warm up the fuel cell itself during start-up of the fuel cell below freezing point;
compute a produced water amount on the basis of a degree of wetness of the fuel cell, a temperature of the fuel cell and a generated power of the fuel cell during warm-up, the produced water amount being a water amount produced in an electrolyte membrane of the fuel cell until the temperature of the fuel cell increases to a freezing point temperature;
determine whether the produced water amount is larger than a water retaining amount, which is a threshold value corresponding to an upper limit value of a water amount retainable in the electrolyte membrane and used to detect leakage of the produced water from the electrolyte membrane, and
increase a power ratio of power supplied to the heater relative to power supplied to the auxiliary machine during the warm-up when the produced water amount is larger than the water retaining amount.

2. The fuel cell system according to claim 1, wherein:
the controller is programmed to increase the power ratio to the heater during the start-up below freezing point by reducing the power to the auxiliary machine during the start-up below freezing point.

3. The fuel cell system according to claim 2, wherein:
the auxiliary machine includes a compressor; and
the controller is programmed to increase the power ratio to the heater during the start-up below freezing point by controlling the compressor so as to provide an air amount based on a power generation current necessary for the power generation of the fuel cell when the controller determines that the produced water amount is larger than the water retaining amount.

4. The fuel cell system according to claim 1, wherein:
the controller is programmed to:
estimate an integrated amount of produced water by calculating a power generation temperature increasing time on the basis of the temperature of the fuel cell and the generated power during the warm-up, the power generation temperature increasing time being a time until the temperature of the fuel cell reaches the vicinity of 0° C. after the fuel cell has started operation below freezing point; and
calculate a sum of the water retaining amount and the integrated amount of the produced water as the produced water amount, the water retaining amount being a water amount representing the degree of wetness of the fuel cell.

5. The fuel cell system according to claim 1, wherein:
the controller is programmed to detect a resistance value of the fuel cell when the fuel cell has stopped operation; and
the controller is programmed to calculate the degree of wetness of the fuel cell during the start-up below freezing point on the basis of the resistance value when the fuel cell has stopped operation.

6. The fuel cell system according to claim 4, wherein:
the controller is programmed to:
specify a cell voltage on the basis of the generated power during the warm-up using a cell characteristic information, the cell characteristic information representing a cell voltage corresponding to a power generation current of the fuel cell;
compute a heat generation amount of the fuel cell on the basis of a difference between the cell voltage and a theoretical voltage;
calculate a necessary heat generation amount until the temperature of the fuel cell reaches the vicinity of 0° C. on the basis of the temperature and a heat capacity of the fuel cell; and
calculate the power generation temperature increasing time by dividing the necessary heat generation amount by the heat generation amount of the fuel cell.

7. The fuel cell system according to claim 5, wherein:
the controller is programmed to:
specify a power generation current from a cell characteristic information on the basis of the generated power during the warm-up and calculate a produced water amount per unit time according to the power generation current; and
calculate an integrated amount on the basis of the calculated produced water amount per unit time and a power generation temperature increasing time, the integrated amount being a water amount produced until the temperature of the fuel cell reaches the vicinity of 0° C.

8. The fuel cell system according to claim 1, wherein:
the temperature of the fuel cell is an inlet temperature of the cooling water flowing into the fuel cell.

9. A control method for a fuel cell system with an auxiliary machine and a heater, the auxiliary machine being electrically connected to a fuel cell, the auxiliary machine being driven by power of the fuel cell, the heater being electrically connected to the fuel cell, the heater being configured to heat cooling water supplied to the fuel cell, the control method comprising:
   supplying the power to the auxiliary machine and the heater so as to warm up the fuel cell itself during start-up of the fuel cell below freezing point;
   computing a produced water amount on the basis of a degree of wetness of the fuel cell, temperature of the fuel cell and generated power during warm-up, the produced water amount being a water amount produced in an electrolyte membrane of the fuel cell until the temperature of the fuel cell increases to a freezing point temperature;
   determining whether the produced water amount is larger than a water retaining amount, which is a threshold value corresponding to an upper limit value of a water amount retainable in the electrolyte membrane and used to detect leakage of the produced water from the electrolyte membrane, and
   increasing a power ratio of power supplied to the heater relative to power supplied to the auxiliary machine when the produced water amount is larger than the water retaining amount.

10. The fuel cell system according to claim 1, wherein:
the controller is programmed to make power of the auxiliary machine during the start-up below freezing point larger than during a normal operation.

11. The fuel cell system according to claim 1, wherein:
the controller is programmed to set each power of the auxiliary machine and the heater at an upper limit of a variable range during the start-up below freezing point.

\* \* \* \* \*